United States Patent [19]

Williams

[11] 3,887,792

[45] June 3, 1975

[54] METHOD AND DEVICE FOR READING AND DECODING A DELTA-DISTANCE CODE

[75] Inventor: Richard E. Williams, Reston, Va.

[73] Assignee: Scope Incorporated, Reston, Va.

[22] Filed: Dec. 4, 1973

[21] Appl. No.: 421,580

[52] U.S. Cl. .......................... 235/61.11 E; 250/566

[51] Int. Cl.² ....................... G06K 7/10; G08C 9/06

[58] Field of Search ...... 235/61.11 E; 250/555, 566; 340/146.3 AG

[56] References Cited

UNITED STATES PATENTS

| | | | |
|---|---|---|---|
| 1,863,098 | 6/1932 | Borel | 235/61.6 K |
| 2,134,284 | 10/1938 | Keefe | 235/61.6 K |
| 2,569,879 | 10/1951 | Balde | 235/61.6 K |
| 2,701,686 | 2/1955 | Guttridge et al. | 235/61.6 K |
| 3,752,963 | 8/1973 | Herrin | 235/61.11 E |
| 3,761,685 | 9/1973 | Alpert et al. | 235/61.11 E |
| 3,763,351 | 10/1973 | Deerhake | 235/61.11 E |
| 3,778,597 | 12/1973 | Vanderpool et al. | 235/61.11 E |
| 3,783,245 | 1/1974 | Howell | 235/61.11 E |
| 3,784,792 | 1/1974 | Dobras | 235/61.11 E |
| 3,792,236 | 2/1974 | Dobras et al. | 235/61.11 E |

*Primary Examiner*—Daryl W. Cook
*Attorney, Agent, or Firm*—John E. Benoit

[57] ABSTRACT

A delta-distance code is scanned to determine the deployment of transitions at zone edges. Selected transitions define the boundaries of zones whose respective time intervals created by the scanning process are measured logarithmically. Data contained in zonal ratios is categorized by the difference between the logarithms of those zones. The categories thus derived define the encoded data.

13 Claims, 4 Drawing Figures

METHOD AND DEVICE FOR READING AND DECODING A DELTA-DISTANCE CODE

This invention relates generally to delta-distance code scanners and more specifically to a logarithmic method and device for reading and decoding delta-distance codes.

A delta-distance code is one whose information is contained in the ratios of distances. A commonly encountered example is that wherein a series of adjacent black and white bars convey information via the ratios of bar widths. A major advantage of delta-distance codes lies with the invariance of the ratio information regardless of the velocity with which the code is scanned. The code additionally exhibits high information capacity per surface area because it does not need to carry additional clock information.

Typical mehtods of scanning and decoding delta-distance codes employ a succession of time measurements for each zone or bar encountered as the scanning progresses. The intervals so measured are sorted into appropriate pairs and division algorithms performed. The coded information is contained in the resulting quotients. The complexity and time associated with the division algorithm normally requires considerable storage and high-speed computing procedures.

The present ivention provides a high-speed delta-distance code reader that dispenses with the division algorithm by producing a succession of measurements corresponding to the logarithms of the zonal dimensions. The division algorithm is thus reduced to one of simple subtraction, resulting in higher speed, lower complexity, lower cost, and greater reliability. The logarithmic procedure additionally accommodates a very large dynamic range of scanning velocities without corresponding increases in the numbers associated with the algorithmic operations.

Accordingly, it is an object of this invention to provide a novel method of reading a delta-distance code.

Another object of this invention is to provide a novel device for reading a delta-distance code.

These and other objects of the invention will become apparent from the following description when taken in conjunction with the drawings wherein.

Broadly speaking, the present invention provides a delta-distance bar code reading and decoding method and device which employ logarithmic measuring and processing of bar code zonal regions to attain novel, rapid, and simple information extraction. The reading and decoding device comprises a log-time generator of the type described in my co-pending U.S. Pat. Application Ser. NO. 408,616 filed on Oct. 23, 1973 entitled "Digital Log-Time Generator," which is assigned to the assignee of the present invention, and commutating, storage, and subtraction means to produce a series of digital readings categorizing the encoded data.

Figure 1:
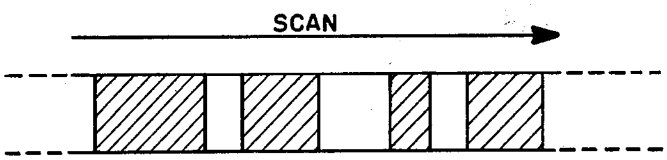
FIG. 1 is a graphic illustration of a delta-distance code segment.

Turning now more specifically to the drawings, FIG. 1 illustrates a typical bar code having encoded information in delta-distance form. The bar code can be of an optical type comprised of black bars on a white background, for example. It can in certain embodiments be of a magnetic type in which the bars may contain magnetized particles that are not present in the interspaces. Other forms may use colors, variations in conductivity, modulations in transparency, and the like. The present invention does not depend upon the composition of the coded material per se but is specifically concerned with the dimensional relationships contained in the code. The illustration of FIG. 1 could, for example, comprise a graphic portrayal of a series of electrical impulses that could be electromagnetically or electrostatically sensed.

Figure 2:
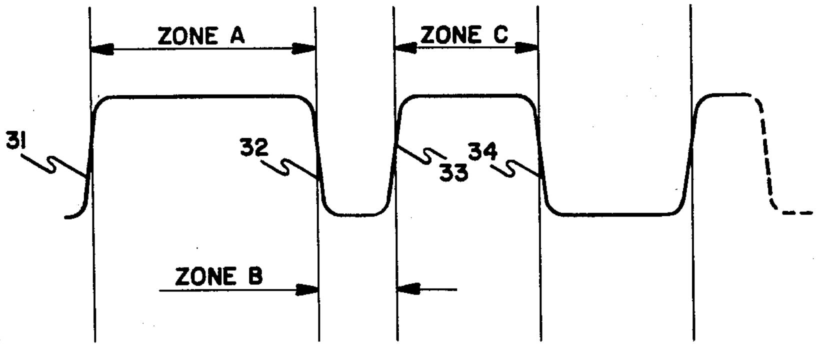
FIG. 2 is a graphic representation of a waveform derived from a code segment.

When a segment of the code pattern of FIG. 1 is scanned by an appropriate sensor, a waveform such as that of FIG. 2 is generated. As time progresses an amplitude is seen to abruptly rise and fall at transition indicia 31–34. The signal naturally divides into zones defined by said indicia. An information category contained in the pattern may be encoded in some instances by the ratio of the intervals associated with zones A and B. In other cases the encoded data might be contained in the ratio of zone A to zone C. Still another ratio could be that of A plus B to A plus C. A variety of combinations is accordingly possible, but the fundamental information is always conveyed by selected ratios of pattern dimensions.

The scanning velocity must be uniform over short distances so that the zonal ratios containing encoded information will not become significantly altered as the pattern dimensions are converted to time intervals by the scanning process. If the ratio of zone A to zone C, for example, were to contain data, the scanning velocity would have to be maintained reasonably constant throughout the region containing zones A and C. A different scanning velocity could work in other regions of the pattern provided piecewise constancy is preserved.

The waveform of FIG. 2 could in one instance be created by a very rapid scan of FIG. 1 in which case the absolute values of the time intervals corresponding to zones A and C would be very small. In another instance the scanning velocity could be very slow in which case the intervals would become very large. It is thus the case that although the ratios remain constant the intervals themselves can vary over very large dynamic ranges without impairing the information content.

The scanning process associates a time interval, $T_1$, with zone A and another time interval, $T_2$, with zone C. Assuming a constant scanning velocity in the region of the zones, the zonal ratio of A/C is tranformed to a similar interval ratio $T_1/T_2$. Although the interval ratio is independent of the absolute scanning velocity, the absolute magnitudes of $T_1$ and $T_2$ can vary over many orders of magnitude. Conventional methods of measuring $T_1$ and $T_2$ employ a high-speed clock and counter so that a digital expression of each interval can be derived. When the intervals are long as in the case of a slow scanning velocity, the count becomes extremely large and the division algorithm required for the ratio is time consuming and costly. The problem is rendered particularly severe if the clock utilized for the measurements is of a sufficiently high speed to accurately measure very short intervals corresponding to high scanning velocities.

The novel method of the present invention measures intervals $J_1$ and $T_2$ logarithmically so that the large dynamic range encountered when scanning velocities are varied is reduced to a logarithmic variation only. For example, a variation of $T_1$ from 10 to 1,000, i.e., 100-fold, would produce a logarithmic count ratio of merely one to three.

A second advantage to the novel logarithmic processing method results from the characteristic of logarithms wherein the logarithm of the ratio $T_1$ to $T_2$ becomes the logarithm of $T_1$ minus the logarithm of $T_2$; i.e., the division algorithm is transformed into one of subtraction. Since division is an iterative subtraction process, the number of algorithmic steps is drastically reduced by the logarithmic method.

When an information category is encoded in the delta-distance bar code as the ratio of $T_1$ to $T_2$, it is similarly contained in log $T_1$ – 8c log $T_2$. In mathematical terms the correspondence is isomorphic, or one-to-one. It is accordingly unnecesary to take an anti-logarithm when the encoded message is discretely categorized by specific zonal ratios. This is almost invariably the practice in delta-distance bar codes.

Figure 3:
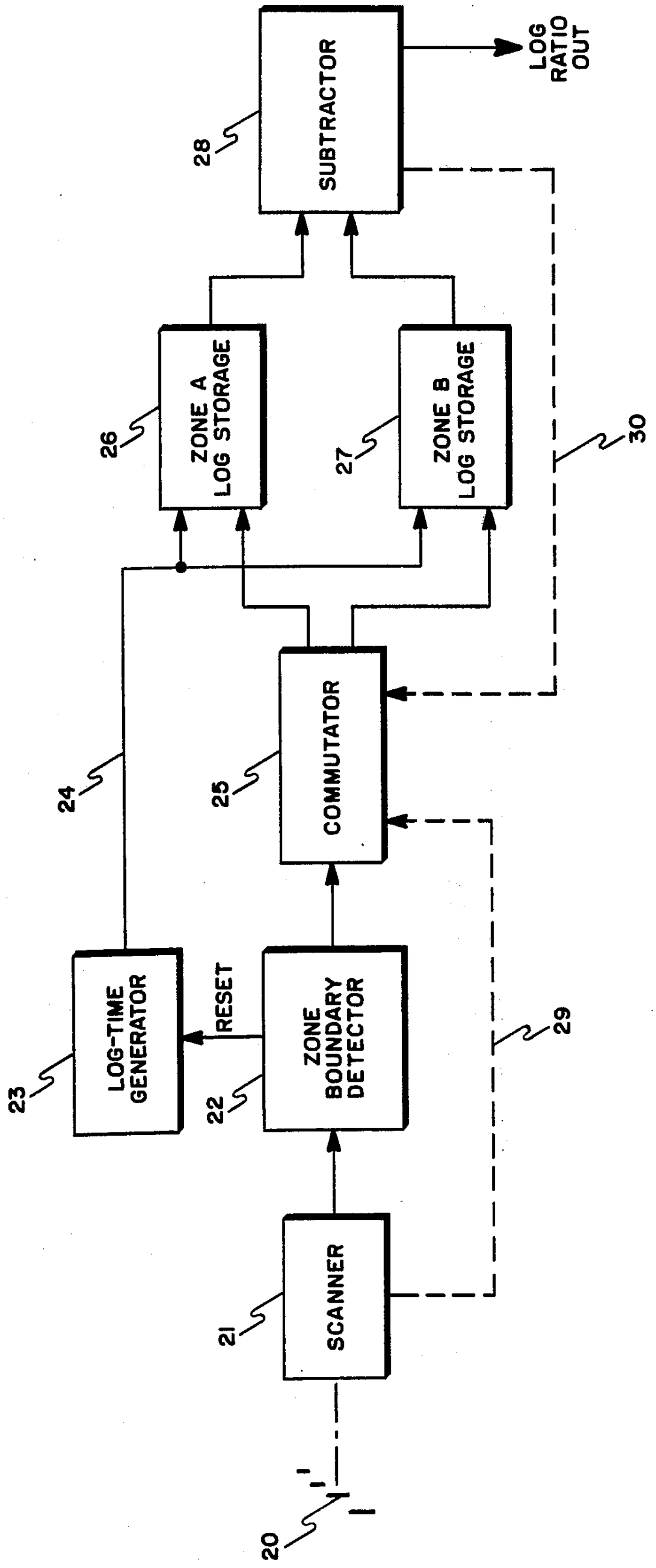
FIG. 3 is a basic block diagram of a novel reading and decoding device constructed according to the invention which is suitable for carrying out the novel reading and decoding method disclosed.

A basic block diagram of a device suitable for reading and decoding a delta-distance bar code via the novel reading and decoding method disclosed is shown in FIG. 3.

A bar pattern 20 having characteristics similar to FIG. 1 is scanned by scanner 21 containing a sensor of a form appropriate to the composition of the code 20. For exemplary purposes code 20 will be assumed optical and comprised of black and white bars. Scanner 21 may, for example, take the form of an optical wand containing a photosensor that can be passed across pattern 20 by mechanical means or by hand. The output of scanner 21 produces a waveform similar to that of FIG. 2.

A zone boundary detector 22 detects the rising and falling edges 31–34 of the scanner output waveform and resets log-time generator 23 on selected edges, not necessarily in contiguous sequence. For convenience in description, however, zones of interest will be assumed as shown in FIG. 2 in which case zone boundary detector 22 will detect edges 31–34 in contiguous sequence.

The log-time generator 23 produces a logarithmic expression of time as measured from a moment corresponding to a waveform transition. The information on buss 24 is comprised of a series of logarithmic descriptions of zone widths, assuming essentially constant scan velocity over the interval of measurement.

Commutator 25 counts zones and assigns logarithmic measurements on buss 4 to a plurality of logarithmic storage registers 26, 27. Commutator 25 can be synchronized to insure proper zone deployment via sensing busses 29 or 30. In some cases the beginning of a coded message can be recognized by a dedicated zonal ratio that can be recognized by subtractor 28 and used to synchronize commutator 25 via buss 30. In other code formats it is sufficient to merely recognize black or white regions sensed by scanner 21.

Subtractor 28 measures zonal ratios by subtracting the logarithms of the respective zonal widths. In the simplest embodiment the output of subtractor 28 remains in logarithmic form and thus is the logarithm of the ratio. As mentioned above, it is normally unnecessary to take the anti-log since a direct correspondence can be established with categorized coded information without the additional step. The important feature of subtractor 28 is that its output will not vary for a given ratio encodation regardless of the absolute value of the scanning velocity.

Figure 4:
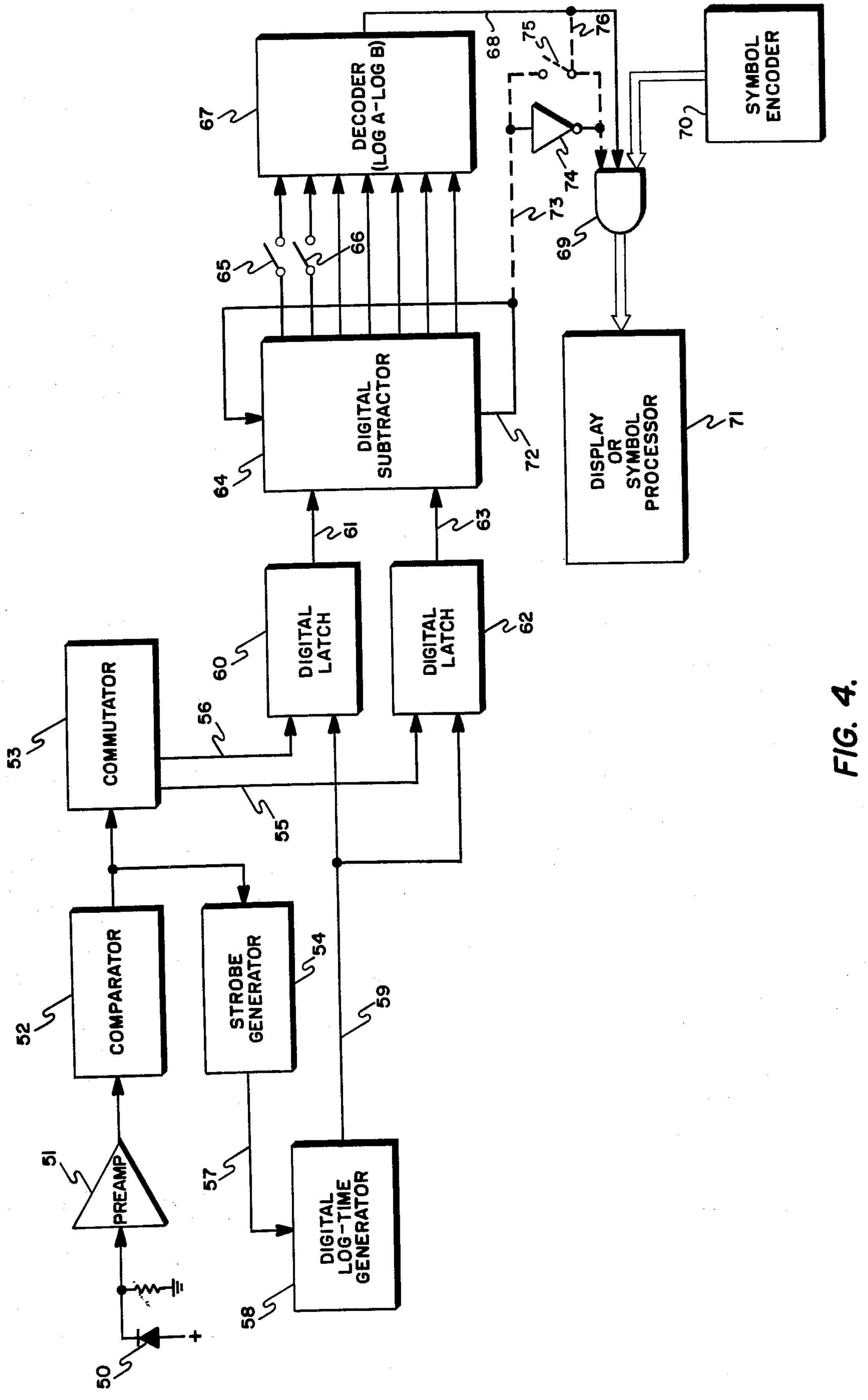
FIG. 4 is a detailed schematic block diagram of a preferred form of the device illustrated in FIG. 3.

FIG. 4 illustrates a preferrred embodiment of a circuit suitable for decoding symbol information encoded as a bar ratio in the manner of FIG. 1. The embodiment of FIG. 4 uses digital processing to obtain high accuracy and stability. A sensor 50 which may take the form of a coil, phototransistor, electostatic terminal, or other device suitable for sensing the delta-distance pattern is connected to the input of a preamplifier 51 whose primary function is to produce a reasonably faithful waveform such as that of FIG. 2. Preamplifier 51 may in some cases include conditioning circuits to reject noise, etc., but its output must essentiallty preserve transition states 31–34 of FIG. 2 without excessive time distortion.

A comparator 52 can be used following the preamp 51 to truncate the signal so that its amplitude becomes constant and compatible for use with succeeding digital logic circuits. As a result commutator 53 and strobe generator 54 can be of conventional integrated-circuit form. Commutator 53 is clocked by comparator 52 output and may be comprised of a binary counter and a one-of-N decoder, both of which are available commercially. Other commutator forms such as ring counters are also acceptable. As signal transitions are sensed by commutator 53 it deploys appropriate gating signals to output busses 55, 56.

For exemplary purposes the method and device for categorizing the ratio of zone A to zone B of FIG. 2 will be described. In that case strobe generator 54 provided a reset strobe for digital log-time generator 58 via buss 57 for each arriving signal transition. Strobe generator 54 may be a monostable multivibrator or similar waveform shaping device. Log-time generator 58 produces a digital output on buss 59 that corresponds to the logarithm of the time interval between successive strobes received on buss 57. The details of operation of log-time generator 58 are described in the aforementioned U.S. Pat. Application Ser. No. 408,616, entitled "Digital Log-Time Generator" and filed on Oct. 23, 1973.

Zone A of FIG. 2, the first zone encountered, is defined by two transitions, 31 and 32. Transition 31 triggers strobe generator 54 and starts digital log-time generator 58. Commutator 53 opens digital latch 60 as the digital output from log-time generator 58 appears on buss 59. At the end of zone a digital latch 60 closes, freezing the digital log-time count on buss 61. Immediately thereafter strobe generator 54 provides a reset strobe on buss 57 to clear and restart digital log-time generator 58.

The second count sequence from log-time generator 58 corresponds to zone B of FIG. 2. Commutator 53 steps by code transitions and thus opens digital latch 62 as digital latch 60 is closed. The log-time count corresponding to zone B thus enters digital latch 62 where it is eventually frozen and held upon arrival of transition 33 of FIG. 2.

The digital word corresponding to a log-time measurement of zone A is held on buss 61, and the word corresponding to zone B on buss 63. Digital subtractor 64 subtracts the digital word on buss 63 from the word on buss 61 to produce a difference that corresponds to the logarithm of the zonal time ratio.

Although busses 59, 61, and 63 can comprise single conductors if serial processing is employed in the circuit, a faster system results if the digital words are parallel processed. In that case busses 59, 61, and 63 will have as many conductors as the digital word may require, e.g., eight conductors for eight-bit notation. Digital subtractor 64 and digital latches 60, 62 similarly are implemented to accommodate the formats of the digital words involved.

Although the action of commutator 53 has been described for contiguous zonal commutation; i.e., zones A and B of FIG. 2, it is obvious to those skilled in the art that commutator 53 can be structured so as to count and select any combination of transitions 31–34 for particular decoding requirements. If, for example, the ratio of zone A to zone C is sought, commutator 53 and strobe generator 54 would first start and stop log-time generator 58 on transitions 31 and 32, respectively. The logarithmic count would be entered into latch 60. Log-time generator 54 would then be started and stopped by the commutator and strobe on transitions 33 and 34, respectively, and the resulting logarithmic count entered into latch 62. Other combinations can be similarly accommodated by appropriately structuring the logic of commutator 53 without departing from the spirit of the invention.

If a 3:1 ratio between zone A and zone B is categorized for exemplary purposes to correspond to a specific encoded symbol such as a letter or number, the delta-distance decoder of FIG. 4 must convert that zonal ratio into the proper symbol identifier. The output of subtractor 64 is comprised of a digital word corresponding to the logarithm of the 3:1 ratio. As pointed out in the above said application entitled "Digital Log-Time Generator" and filed Oct. 23, 1973, digital log-time generator 58 preferably linearly counts between successive powers of two to yield an interpolated logarithmic measurement in binary notation. Assuming that 16 interpolation counts are produced by generator 58, a 2:1 zonal ratio will result in a difference of 16 at the output of digital subtractor 64. A 3:1 ratio will result in a difference count of approximately 24. The difference counts are unaffected by scanning velocity as long as the velocity is uniform throughout the two pattern zones.

The output of subtractor 64 is typically in binary notation, and if one or more of the least significant bits are selectively disabled by switches 65, 66, its output resolution is correspondingly reduced. If, for example, the two least significant bits are disabled, the resolution is impaired by ± counts, i.e., binary counts from 0 through 3. Thus through the simple means of selectively disabling lower significant bits a zonal ratio tolerance to accommodate printing and scanning aberrations can be introduced.

The nominal difference count at the output of digital subtractor 64 is categorized by decoder 67. The decoder is conventional and is typically comprised of a matrix of simple logical elements serving to recognize the binary word at subtractor 64 output. In the case of the 3:1 zonal ratio the matrix is configured to decode the nominal binary expression for a count of 24. Additional decoding matrices connected to subtractor 67 can be employed to categorize other zonal ratios if desired.

A 3:1 zonal ratio sequence in a forward scan direction corresponds to a 1:3 ratio in the reverse direction. Subtractor 64 supplies a means of accommodating either or both directions by providing an end-carry (sign of the difference) on buss 72. An end carry will occur exclusively for the 3:1, but not the 1:3, ratio. The end-carry action of the subtractor is conventional, and is described, for example, in literature on the commercially-available 74181 integrated circuit.

The end-carry signal on buss 72 is used within the subtractor to recomplement its output, and an output word of absolute value 24 is generated for both a 3:1 and a 1:3 ratio. In the absence of buss 73 both are treated identically; i.e., reverse and forward scans generate identical binary words. If a forward-reverse scanning sense is desired or reciprocal folding is to be avoided, the end-carry signal on buss 72 is used to selectively gate decoder 67 output via buss 73 and gate 69. Since buss 73 carries the sign of the logarithmic difference, it serves to distinguish the zonal ratio from its reciprocal. An inverter 74 can in some applications be controlled by decoder 67 via buss 76 and switch 75 to sense and correct for the scanning direction.

A symbol encoder 70 whose output may comprise a convenient or standard notation for the information symbol of the categorized zonal ratio is enabled by gate 69. A standard symbol encodation may be of EBCDIC, BCD, ASCII, or other well known form.

When activated by a signal on buss 68, gate 69 transmits the desired symbol notation from encoder 70 to display or symbol processor 71. Accordingly, the circuit of FIG. 4 serves to extract and categorize information from a delta-distance code pattern in a manner essentially invariant to scanning velocity and, if desired, scanning direction.

While the invention has been particularly shown and described with reference to preferred embodiments thereof, it will be understood by those skilled in the art that various changes in form and details may be made therein without departing from the spirit and scope of the invention.

I claim:

1. A method for decoding a multiple zone coded representation which includes two or more zonal dimensions bounded by three or more detachable transitions and in which a ratio of dimensions comprises coded data, comprising the steps of:

logarithmically measuring a dimension between a first pair of transitions;

logarithmically measuring a dimension between a second pair of transitions of which at least one member is not included in said first pair;

categorizing the difference between the measurements whereby the categorization defines a zone coded representation in terms of a dimensional ratio.

2. The method set forth in claim 1 in which said transitions comprise boundaries between bars and areas of detectably different characteristics.

3. The method set forth in claim 1 in which said zonal dimensions comprise distances between bar edges.

4. The method set forth in claim 1 in which said zonal dimensions comprise intervals between detectable transitions.

5. A method for decoding a multiple zone coded representation which includes two or more zonal dimensions bounded by three or more detectable transitions and in which a ratio of dimensions comprises coded data, comprising the steps of:

logarithmically measuring in sequence a first dimension between a first pair of transitions;

logarithmically measuring in sequence a second dimension between a second pair of transitions of which at least one member is not included in said first pair;

categorizing the difference between the measurements, in the sequence measured, whereby the sequential categorization defines a zone coded representation in terms of a dimensional ratio.

6. The method set forth in claim 4 in which said transitions comprise boundaries between bars and areas of detectably different characteristics.

7. The method set forth in claim 4 in which said zonal dimensions comprise measurements between bar edges.

8. The method set forth in claim 4 in which said zonal dimensions comprise intervals between detectable transitions.

9. A device for scanning and decoding a multiple zone coded representation which includes two or more zonal dimensions bounded by three or more detectable transitions and in which a ratio of dimensions comprises coded data, comprising:

first means for scanning the representation and generating electrical signals which are an analog of the representation;

second means responsive to said first means for generating a plurality of signals substantialy coincident in time with the scan of said detectable transitions;

third means reponsive to said second means for generating and storing a plurality of signals respectively indicative of the logarithms of the times required to scan the representation between said detectable transitions;

fourth means responsive to said third means for generating a unique signal corresponding to a categorization of a difference between predetermined members of said stored signals whereby the categorization defines a zone coded representation in terms of a dimensional ratio.

10. A device as set forth in claim 9 in which said second means includes means for selecting a detectable transition to satisfy a predetermined criterion.

11. A device as set forth in claim 9 in which said predetermined members are of predetermined sequence.

12. A device as set forth in claim 9 in which said fourth means includes means reponsive to the sign of said difference and means responsive to said sign to gate said unique signal.

13. A device as set forth in claim 12 in which said fourth means includes means for selectively reversing said sign to satisfy a predetermined criterion.

* * * * *